(12) United States Patent
Böhm et al.

(10) Patent No.: US 11,543,051 B2
(45) Date of Patent: Jan. 3, 2023

(54) VACUUM VALVE WITH POSITION SENSOR

(71) Applicant: VAT HOLDING AG, Haag (CH)

(72) Inventors: Christoph Böhm, Grosswangen (CH); Adrian Eschenmoser, Grabs (CH); Kyle Axle Elford, Vaduz (LI)

(73) Assignee: VAT HOLDING AG, Haag (CH)

( * ) Notice: Subject to any disclaimer, the term of this patent is extended or adjusted under 35 U.S.C. 154(b) by 0 days.

(21) Appl. No.: 16/627,152

(22) PCT Filed: Jun. 28, 2018

(86) PCT No.: PCT/EP2018/067466
§ 371 (c)(1),
(2) Date: Dec. 27, 2019

(87) PCT Pub. No.: WO2019/002491
PCT Pub. Date: Jan. 3, 2019

(65) Prior Publication Data
US 2020/0182375 A1    Jun. 11, 2020

(30) Foreign Application Priority Data
Jun. 30, 2017  (EP) .................................... 17179066

(51) Int. Cl.
*F16K 37/00* (2006.01)
*F16K 3/10* (2006.01)
*F16K 3/18* (2006.01)
*F16K 51/02* (2006.01)

(52) U.S. Cl.
CPC ............ *F16K 37/0041* (2013.01); *F16K 3/10* (2013.01); *F16K 3/18* (2013.01); *F16K 51/02* (2013.01)

(58) Field of Classification Search
CPC .. F16K 51/02; F16K 37/0041; F16K 37/0075; F16K 37/0083; F16K 3/10; F16K 3/04; F16K 3/18
See application file for complete search history.

(56) References Cited

U.S. PATENT DOCUMENTS

| 3,145,969 A | 8/1964 | Von Zweck |
| 5,329,465 A * | 7/1994 | Arcella ............... F16K 37/0083 702/184 |

(Continued)

FOREIGN PATENT DOCUMENTS

| CN | 1445470 A | 10/2003 |
| CN | 1734144 A | 5/2009 |

(Continued)

OTHER PUBLICATIONS

International Search Report and Written Opinion dated Jun. 28, 2018 in International Application No. PCT/EP2018/067466.

*Primary Examiner* — David Colon-Morales
(74) *Attorney, Agent, or Firm* — Muncy, Geissler, Olds & Lowe, P.C.

(57) ABSTRACT

Disclosed is a vacuum valve having a valve closure and having a drive unit which is coupled to the valve closure and which has at least one adjustment element. The vacuum valve furthermore has a position sensor, in particular a travel or distance sensor, such that a position of the valve closure and/or of the at least one adjustment element relative to a zero position, in particular an open position or closed position of the vacuum valve, can be measured.

10 Claims, 6 Drawing Sheets

(56) References Cited

U.S. PATENT DOCUMENTS

Figure 1A:
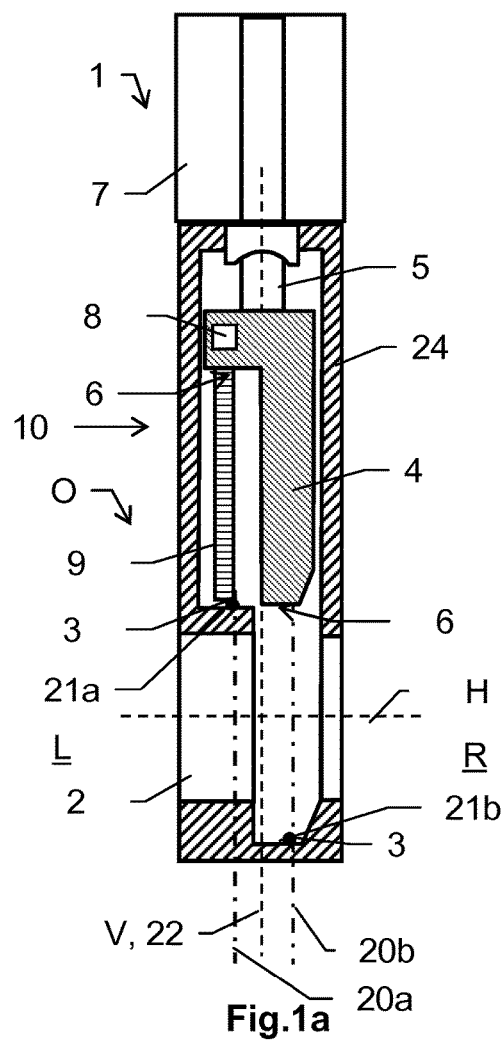

| | | | |
|---|---|---|---|
| 5,566,922 A * | 10/1996 | Tanaka | F16K 3/188 |
| | | | 251/157 |
| 5,577,707 A | 11/1996 | Brida | |
| 6,056,266 A | 5/2000 | Blecha | |
| 6,089,537 A | 7/2000 | Olmsted | |
| 6,267,138 B1 * | 7/2001 | Hoffmann | G05B 19/406 |
| | | | 137/551 |
| 6,416,037 B1 | 7/2002 | Geiser | |
| 6,597,290 B2 * | 7/2003 | Mogi | F16K 37/0083 |
| | | | 340/686.1 |
| 6,629,682 B2 | 10/2003 | Duelli | |
| 7,163,025 B2 | 1/2007 | Kajitani | |
| 7,168,676 B2 | 1/2007 | Kajitani | |
| 8,132,782 B2 | 3/2012 | Duelli et al. | |
| 9,394,897 B2 | 7/2016 | Lohkamp et al. | |
| 10,132,420 B2 * | 11/2018 | Long | F16K 31/047 |
| 2005/0045235 A1 | 3/2005 | Kajitani | |
| 2005/0067603 A1 | 3/2005 | Lucas et al. | |
| 2005/0242312 A1 | 11/2005 | Kajitani | |
| 2010/0117015 A1 | 5/2010 | Schaible et al. | |
| 2014/0130907 A1 * | 5/2014 | Watanabe | G05D 16/024 |
| | | | 137/487.5 |
| 2014/0183391 A1 * | 7/2014 | Blecha | F16K 51/02 |
| | | | 251/158 |
| 2016/0169410 A1 * | 6/2016 | Wheeler | G05B 23/0205 |
| | | | 137/1 |
| 2018/0339816 A1 * | 11/2018 | Oldendorf | B65D 45/02 |

FOREIGN PATENT DOCUMENTS

| | | |
|---|---|---|
| CN | 101725721 A | 6/2010 |
| CN | 101755157 A | 6/2010 |
| DE | 10 2007 034926 A1 | 2/2009 |
| JP | H03-234979 | 10/1991 |
| JP | 2004-108471 A | 4/2004 |
| JP | 2004-360754 | 12/2004 |
| JP | 2005-076828 | 3/2005 |
| JP | 2005-337488 | 12/2005 |
| JP | 2010-534301 | 11/2010 |
| KR | 20080008260 A | 1/2008 |

* cited by examiner

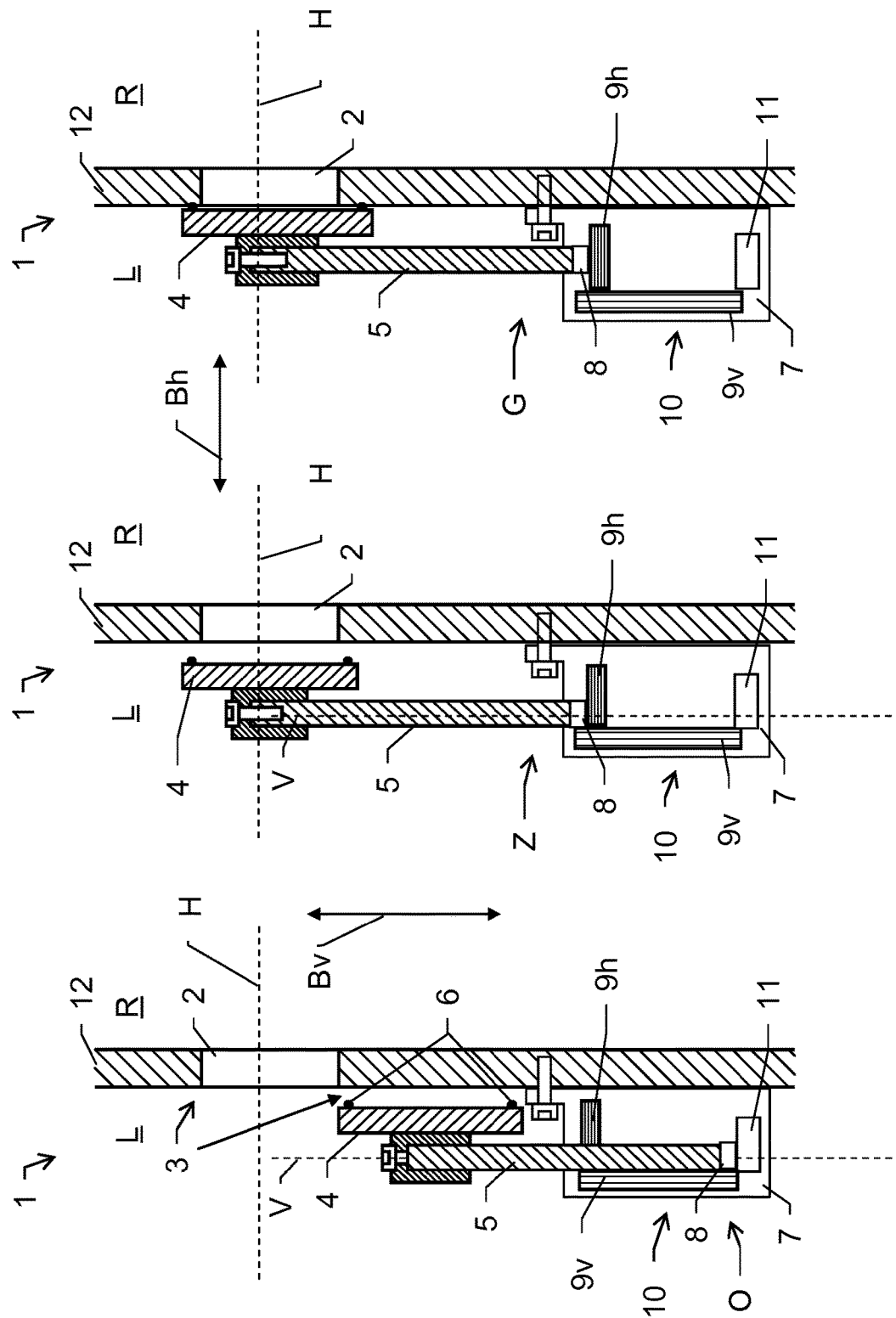

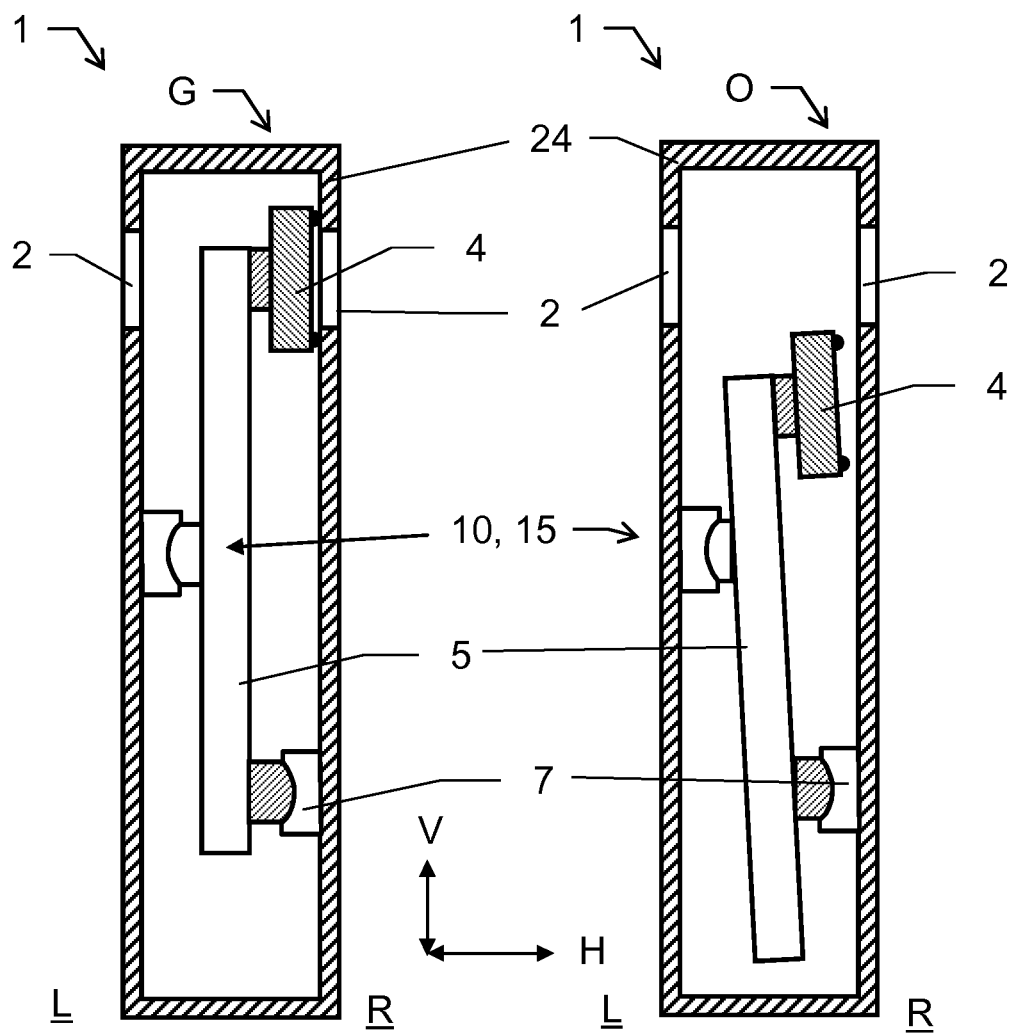

VACUUM VALVE WITH POSITION SENSOR

This application is a 371 National Phase of PCT Application No. PCT/EP2018/067466, filed on Jun. 28, 2018; which claims priority to European Patent application 17179066.0 filed Jun. 30, 2017 and each of which is herein incorporated by reference in its entirety.

The invention relates to a vacuum valve having at least one position sensor and a method for controlling a vacuum valve using a position measurement.

Vacuum valves for regulating a volume or mass flow and/or for essentially gas-tight closing of a flow path leading through an opening formed in a valve housing are generally known from the prior art in various embodiments and are used in particular in vacuum chamber systems in the area of IC, semiconductor or substrate production, which must take place in a protected atmosphere as far as possible without the presence of contaminating particles. Such vacuum chamber systems comprise in particular at least one evacuatable vacuum chamber which is provided for receiving semiconductor elements or substrates to be processed or produced and which has at least one vacuum chamber opening through which the semiconductor elements or other substrates can be guided into and out of the vacuum chamber, and at least one vacuum pump for evacuating the vacuum chamber. For example, in a production plant for semiconductor wafers or liquid crystal substrates, the highly sensitive semiconductor or liquid crystal elements pass sequentially through several process vacuum chambers in which the parts located within the process vacuum chambers are each processed by means of a processing device. Both during the machining process within the process vacuum chambers and during the transport from chamber to chamber, the highly sensitive semiconductor elements or substrates must always be in a protected atmosphere—especially in an airless environment.

For this purpose, peripheral valves are used to open and close a gas inlet or outlet and transfer valves are used to open and close the transfer openings of the vacuum chambers for inserting and removing the parts.

The vacuum valves through which semiconductor parts pass are referred to as vacuum transfer valves due to the area of application described and the associated dimensioning, as rectangular valves due to their mainly rectangular opening cross-section and also as slide valves, rectangular sliders, or transfer slide valves due to their normal mode of operation.

Peripheral valves are used in particular to control or regulate the gas flow between a vacuum chamber and a vacuum pump or another vacuum chamber. For example, peripheral valves are located within a pipe system between a process vacuum chamber or a transfer chamber and a vacuum pump, the atmosphere, or another process vacuum chamber. The opening cross-section of such valves, also known as pump valves, is generally smaller than that of a vacuum transfer valve. Peripheral valves are also called control valves because, depending on the application, they are not only used to completely open and close an opening, but also to control or regulate a flow by continuously adjusting the opening cross-section between a complete open position and a gas-tight closed position. A possible peripheral valve for controlling or regulating the gas flow is the pendulum valve.

In a typical pendulum valve, as known from U.S. Pat. No. 6,089,537 (Olmsted), the first step is to rotate a normally round valve plate from a position that releases the opening, the open position, to an intermediate position that covers the opening via an opening that is usually also round. In the case of a slide valve, as described for example in U.S. Pat. No. 6,416,037 (Geiser) or U.S. Pat. No. 6,056,266 (Blecha), the valve plate, as well as the opening, is usually rectangular and in this first step is pushed linearly from a position releasing the opening into an intermediate position covering the opening. In this intermediate position, the valve plate of the pendulum or slide valve is located at a distance from and opposite to the valve seat surrounding the opening. In a second step, the distance between the valve plate and the valve seat is reduced so that the valve plate and the valve seat are pressed evenly against each other, so that the valve closure reaches a closed position and the opening is closed essentially gas-tight. This second movement preferably occurs in a direction substantially perpendicular to the valve seat.

The respective end position of an adjustment movement, i.e., the open position and the closed position (and if an adjustment movement made of two combined partial movements in at least two different adjustment directions is provided, also the intermediate position) is detected and/or maintained in this case using mechanical end position switches. Narrow tolerance limits are disadvantageously to be maintained for this purpose for an exact closure.

The sealing can either take place via a sealing ring arranged on the closure side of the valve plate, which is pressed onto the valve seat circumferential around the opening, or via a sealing ring on the valve seat, against which the closure side of the valve plate is pressed. Due to the closing procedure occurring in two steps, the sealing ring between the valve plate and the valve seat is hardly subjected to shear forces, which would destroy the sealing ring, since the movement of the valve plate in the second step takes place essentially linearly perpendicularly onto the valve seat.

Various prior art sealing devices are known, for example from the U.S. Pat. No. 6,629,682 B2 (Duelli). A suitable material for sealing rings and seals in vacuum valves is, for example, fluoro rubber, also known as FKM, in particular the fluoroelastomer known under the trade name "Viton", and perfluororubber, FFKM for short.

From the prior art, different drive systems are known to achieve a rotational movement of the valve plate of the pendulum valve and a translational movement of the valve plate of the slide valve parallel to the opening and a substantially translational movement perpendicular to the opening, for example from U.S. Pat. No. 6,089,537 (Olmsted) for a pendulum valve and from U.S. Pat. No. 6,416,037 (Geiser) for a slide valve.

The valve plate must be pressed against the valve seat in such a way that both the required gas tightness within the entire pressure range is ensured and damage to the sealing medium, in particular the sealing ring in the form of an O-ring, caused by excessive pressure loading is avoided. In order to guarantee this, well-known valves provide for pressure regulation of the valve plate which is regulated depending on the pressure difference prevailing between the two valve plate sides. Especially with large pressure fluctuations or the change from partial vacuum to overpressure, or vice versa, an even force distribution along the entire circumference of the sealing ring cannot always be guaranteed. In general, the aim is to decouple the sealing ring from support forces resulting from the pressure applied to the valve. In the U.S. Pat. No. 6,629,682 (Duelli), for example, a vacuum valve with a sealing medium is proposed, which consists of a sealing ring and an adjacent support ring, so that the sealing ring is essentially free of support forces.

In order to achieve the required gas tightness, possibly for both overpressure and partial vacuum, some well-known pendulum valves or slide valves additionally or alternatively to the second movement step provide a valve ring which can be displaced perpendicularly to the valve plate, surrounds the opening, and is pressed onto the valve plate to close the valve in a gas-tight manner. Such valves with valve rings that can be actively displaced relative to the valve plate are known, for example, from DE 1 264 191 B1, DE 34 47 008 C2, U.S. Pat. No. 3,145,969 (von Zweck) and DE 77 31 993 U. U.S. Pat. No. 5,577,707 (Brida) describes a pendulum valve with a valve housing having an opening and a valve plate that swivels parallel across the opening to control flow through the opening. A valve ring which surrounds the opening can be actively moved vertically in the direction of the valve plate by means of several springs and compressed air cylinders. A possible further development of this pendulum valve is proposed in US 2005/0067603 A1 (Lucas et al.).

Since the valves mentioned above are used, among other things, in the production of highly sensitive semiconductor elements in a vacuum chamber, a corresponding sealing effect must also be reliably guaranteed for such process chambers. For this purpose, in particular the condition of a sealing material or a sealing surface in contact with the sealing material during compression is of particular importance. During the service life of a vacuum valve, wear of the sealing material or the sealing surfaces can typically occur.

Furthermore, the drive system and/or the mechanically moving components of the valve are susceptible to faults, for example, because of appearances of wear or aging or because of external interfering influences such as mechanical shocks or the like, so that impairments of the sealing action or the function or reliability of the vacuum valve in general can occur. There has heretofore been no option in the prior art to recognize such faults early and/or beforehand.

To keep the quality of the valve and/or the sealing at a sufficiently high level consistently, maintenance of the valve therefore typically takes place at specific time intervals, frequently by replacing or restoring parts of the valve, for example, the seal, drive parts, or the valve as a whole. Such a maintenance cycle is usually dimensioned in this case based on the number of the opening and closing cycles to be expected in a certain period of time. The maintenance thus usually takes place as a precaution to be able to preclude the occurrence of a leak or other malfunctions beforehand as much as possible.

Such a maintenance requirement is not limited to the sealing material or the valve plate alone but extends, for example, to the valve seat, which forms a part of the vacuum valve corresponding to the valve plate. The structure of a sealing surface on the side of the valve seat, e.g. a groove embedded in the valve seat, is also affected by mechanical stress. Therefore, a structural change in the groove resulting from valve operation may also impair the seal. Appropriate maintenance intervals are typically also defined for this purpose.

A disadvantage of this valve maintenance is its precautionary character. Parts affected by maintenance are usually renewed or replaced before their regular or actual life expires, which means an elevated cost expenditure. Each such maintenance step usually means a certain downtime for a production process and an increased technical and financial effort. In sum, this means a stoppage in production at intervals that are shorter than necessary and more frequent than would be necessary at all.

The invention is therefore based on the object of providing an improved vacuum valve, which allows an optimized operation.

It is a further object of the invention to provide an improved vacuum valve, which allows optimized valve maintenance and thus an improvement, i.e. a shortening of possible process stoppages.

It is a further object of the invention to provide an improved vacuum valve which enables a lengthening of the service life of individual valve parts.

It is a further object of the invention to provide an improved vacuum valve, which places less strict tolerance requirements on individual components and/or on the production.

These objects are solved by the realization of the characterizing features of the independent claims. Features which further develop the invention in an alternative or advantageous way can be found in the dependent patent claims.

The basic idea of the present invention is to equip a vacuum valve with a position sensor and to design the valve and the sensor arrangement in such a way that a, preferably progressive, determination or monitoring of the position of at least one of the mechanically moved parts of the valve is enabled.

The subject matter of the invention is thus a vacuum valve, preferably a vacuum slide valve, a pendulum valve or a monovalve, for regulating a volume or mass flow and/or for gas-tight interruption of a flow path, having a valve seat which has a valve opening defining an opening axis and a first sealing surface surrounding the valve opening. The valve seat can be an integral or structural component of the vacuum valve in this case and in particular can embody a part of the valve housing. Alternatively, the valve seat can be formed by the opening of a process chamber, for example, a vacuum chamber, and can form a vacuum valve in the meaning of the present invention in cooperation with the valve closure movable in relation to the valve seat.

Furthermore, the vacuum valve comprises a valve closure, in particular a valve plate, for the regulation of the volume or mass flow and/or for the interruption of the flow path, having a second sealing surface corresponding to the first sealing surface, the variable location of which is determined by a respective position and alignment of the valve closure. Moreover, the vacuum valve has a drive unit coupled to the valve closure comprising at least one movable adjustment element, for example, an adjustment arm, wherein the drive unit is designed to execute an adjustment movement, so that the valve closure is thus adjustable from an open position, in which the valve closure and the valve seat are provided without contact in relation to one another, into a closed position, in which an axially sealing contact with respect to the opening axis exists between the first sealing surface and the second sealing surface, in particular via a seal, and the valve opening is thus closed gas-tight, and back again.

In particular, one or both of the two sealing surfaces has a seal made of sealing material. The sealing material can be, for example, a polymer-based material (for example, an elastomer, in particular a fluoroelastomer), which is vulcanized onto the sealing surface or is provided as an O-ring in a groove in the valve closure or the valve seat. Sealing surfaces are thus, in the scope of the invention, preferably considered to be those surfaces in which a seal made of sealing material is provided in compressed form to close the valve opening (closed position).

The drive unit can be designed as an electric motor (stepper motor) or as a combination of multiple motors or as a pneumatic drive. In particular, the drive unit provides a movement of the valve closure in at least two directions (essentially orthogonal to one another).

According to the invention, the vacuum valve has at least one position sensor, wherein the position sensor is designed and arranged in the vacuum valve such that a position of the valve closure and/or the at least one adjustment element, in particular an adjustment arm, is measurable, preferably progressively, with respect to a null position, in particular the open position or closed position.

The position sensor is preferably a displacement sensor comprising a position-transducing element. Alternatively, the sensor is designed as a distance sensor. In the case of multiple sensors, both types can also be used. The position sensor is preferably designed as an absolute position sensor, and therefore positions are determinable without approaching the null position, for example, by means of a unique position code on a ruler, a material measure, or a scale of the sensor.

The sensor is preferably designed and arranged in the vacuum valve such that the time curve of at least part of the adjustment movement is determinable. Thus, multiple positions are determined in sequence over a specific time span, for example, such that at least one velocity of the adjustment movement or the adjustment element and/or the valve closure is determinable or derivable therefrom for at least this one time span of the adjustment movement. In addition, accelerations can furthermore also be determined from the position measurements.

As an option, the adjustment movement comprises an at least essentially linear movement and the position sensor is designed and arranged to acquire at least a part of or the entirety of the linear movement, wherein the position sensor is preferably a linear encoder.

Alternatively or additionally, the adjustment movement comprises an at least essentially rotational movement and the position sensor is designed and arranged to acquire at least a part of or the entirety of the rotational movement, wherein the position sensor is preferably an angle encoder.

The position sensor is optionally an inductive, optical, magnetic, magnetostrictive, potentiometric, and/or capacitive position sensor. As a further option, the position sensor is arranged outside a vacuum region, which is defined by the vacuum valve and is separated from an external environment. It is thus advantageous in this case that the sensor arrangement can be designed, for example, such that the sensor itself, for example, does not have to be moved into the vacuum region and therefore a comparatively lesser construction expenditure can be ensured.

In some embodiments, the position sensor is designed and arranged in the vacuum valve such that by means of the one position sensor, a position measurement can be carried out with respect to at least two adjustment directions, which are essentially orthogonal to one another in particular, i.e., a single position sensor can determine positions with respect to multiple axes or directions. This takes place, for example, in that a target of the sensor is received from multiple rulers, either sequentially, for example, firstly upon adjustment along the first adjustment direction and then upon adjustment along the second adjustment direction, or simultaneously, for example, by design as a 2D position sensor. Alternatively, the vacuum valve has at least two position sensors, which are designed and arranged in the vacuum valve such that a position with respect to a first adjustment direction is measurable by means of the first position sensor and a position with respect to a second adjustment direction is measurable by means of the second position sensor, in particular wherein both adjustment directions are essentially orthogonal to one another.

In one embodiment, the vacuum valve has a monitoring and control unit for activating the drive unit using predefined control values to adjust the valve closure between the open position and the closed position, wherein the drive unit, the valve closure, and the sensor are designed and interact such that the control values are set based on the measurement signal of the sensor, in particular such that the measurement signal continuously corresponds to a predefined setpoint value.

In this case, the vacuum valve, the sensor arrangement, and the monitoring and control unit are optionally configured, for example, such that the position sensor is in one-sided or two-sided communication, for example, via a conventional wired or wireless connection, with the monitoring and control unit for provision and transmission of the measurement signal.

The vacuum valve can furthermore have a processing unit designed such that, for example, in particular provided by the monitoring and control unit or the sensor arrangement, an acquired measurement signal is processable by means of the processing unit and an item of state information can be generated on the basis of the acquired measurement signal. The acquired measurement signals can then be further processed and provided for the provision of an item of state information which can be evaluated, for example, for the valve regulation by the monitoring and control unit or as user information.

The item of state information can provide, for example, an item of information with respect to a mechanical and/or structural integrity of the valve closure and/or the adjustment element, for example, based on an actual-setpoint comparison for the acquired position measurement signal, for example, based on an acquired and an expected position for a reference (setting) position of the drive unit.

Furthermore, based on the item of state information, an output signal can be provided, which specifies a relationship of the acquired position sensor measurement signal to specific tolerance values. Thus, in particular an evaluation can take place with respect to a process controlled by the vacuum valve, for example, an evaluation of whether a required sealing action is achieved or possible damage, for example, to the adjustment elements or sealing surfaces can be recognized. For example, it can then be indicated to a user, for example, by a visual or acoustic signal whether a process runs within the required tolerances or an undesired falling below or exceeding of such a tolerance is to be expected (for example, based on the adjustment velocity or end location).

The present invention moreover comprises methods for controlling a vacuum valve, in particular a vacuum slide valve, pendulum valve, or monovalve, wherein the vacuum valve is designed for the regulation of a volume or mass flow and/or for the gas-tight interruption of a flow path. The vacuum valve to be controlled has a valve seat in this case, which has a valve opening defining an opening axis and a first sealing surface circumferential around the valve opening, a valve closure, in particular a valve plate, for the regulation of the volume or mass flow and/or for the interruption of the flow path, comprising a second sealing surface corresponding to the first sealing surface, the variable location of which is determined by a respective position and alignment of the valve closure, a drive unit coupled to the valve closure comprising at least one movable adjustment element, wherein the drive unit is designed to execute an adjustment movement, and therefore the valve closure is adjustable from an open position, in which the valve closure and the valve seat are provided without contact in relation to one another, into a closed position, in which, in particular via a seal, an axially sealing contact with respect to the opening axis exist between the first sealing surface and the second sealing surface and the valve opening is thus closed gastight, and back.

According to the invention, in the scope of the method, an in particular absolute position of the valve closure and/or the at least one adjustment element with respect to a null position, in particular the open position or closed position, is measured, in particular progressively.

In one refinement of the method, an item of state information of the vacuum valve, in particular with respect to a mechanical and/or structural integrity of the valve closure or the valve element, is ascertained in the scope of the method based on the position measurement, wherein preferably the item of state information is ascertained by means of an actual-setpoint comparison for the acquired measurement signal and/or, based on a comparison of the item of state information to predefined tolerance values, an output signal is provided with respect to an evaluation of a process controlled by the vacuum valve.

An adjustment velocity of the valve closure and/or the at least one adjustment element is optionally determined at least for a part of the adjustment movement and/or the duration of the adjustment movement from the open position to the closed position and/or vice versa in the scope of the method based on the position measurement. Such items of information can be output to a user in this case in the form of a diagram for analysis and/or can be analyzed automatically.

As a further option, a detection of an end location, in particular the open position and/or closed position, of the valve closure and/or the at least one adjustment element and/or a possible impact of the sealing surfaces on one another in the scope of the adjustment movement and/or a possible adhesion of the sealing surfaces on one another takes place in the scope of the method based on the position measurement.

The subject matter of the present invention is furthermore a computer program product having program code which is stored on a machine-readable carrier, in particular a control and processing unit of a vacuum valve according to the invention, or a computer data signal, embodied by an electromagnetic wave, for carrying out the method according to the invention.

The present invention thus advantageously provides a vacuum valve which enables an ongoing or continuous position measurement of the valve closure and/or of adjustment elements, in such a way that adjustment movements or sequences can be monitored or checked and possibly evaluated. Furthermore, the position measurement enables an automatic and ongoing state verification of the vacuum valve and/or individual ones of its components, for example, the drive unit, of seals, or of adjustment elements, wherein items of state information can be ascertained or derived not only directly via moving components, but rather also indirectly via stationary parts. Faults or irregularities which indicate future faults can only be recognized early or at all in this case, and/or unnecessary maintenance can be avoided because a lack of faults is established. The checks can advantageously take place during the normal process sequences in this case, and therefore they do not have to be interrupted.

The vacuum valve according to the invention is described in more detail below by means of embodiment examples schematically shown in the drawings. The same elements are marked in the figures with the same reference numerals. As a rule, the embodiments described are not to scale and are not to be understood as limitations.

Figure 2:
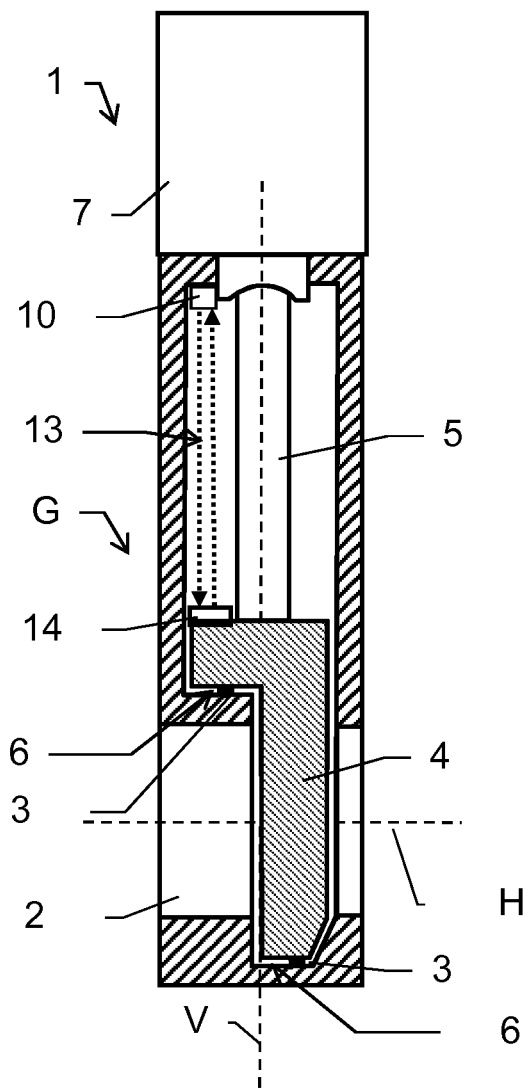
Figure 4A:
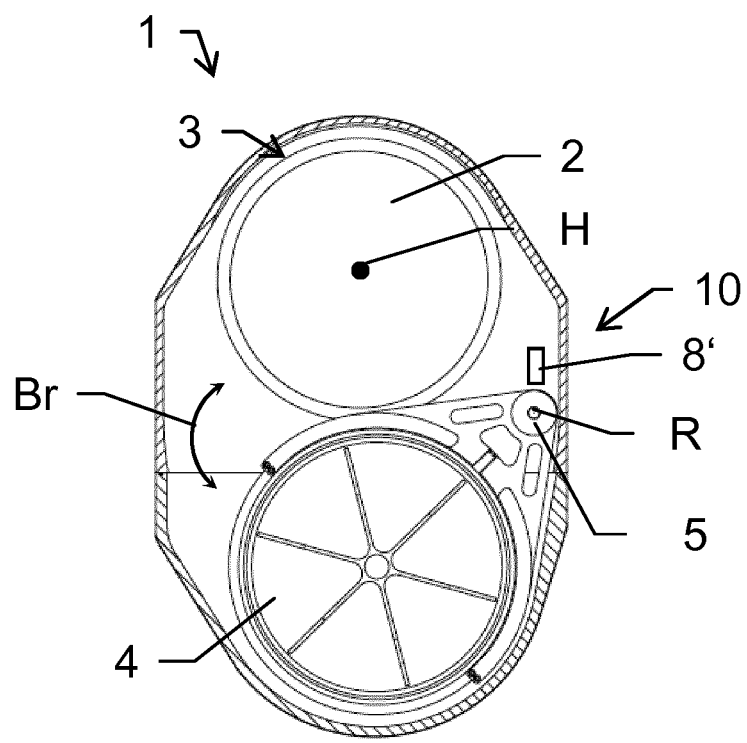
Figures 6A, 6B:
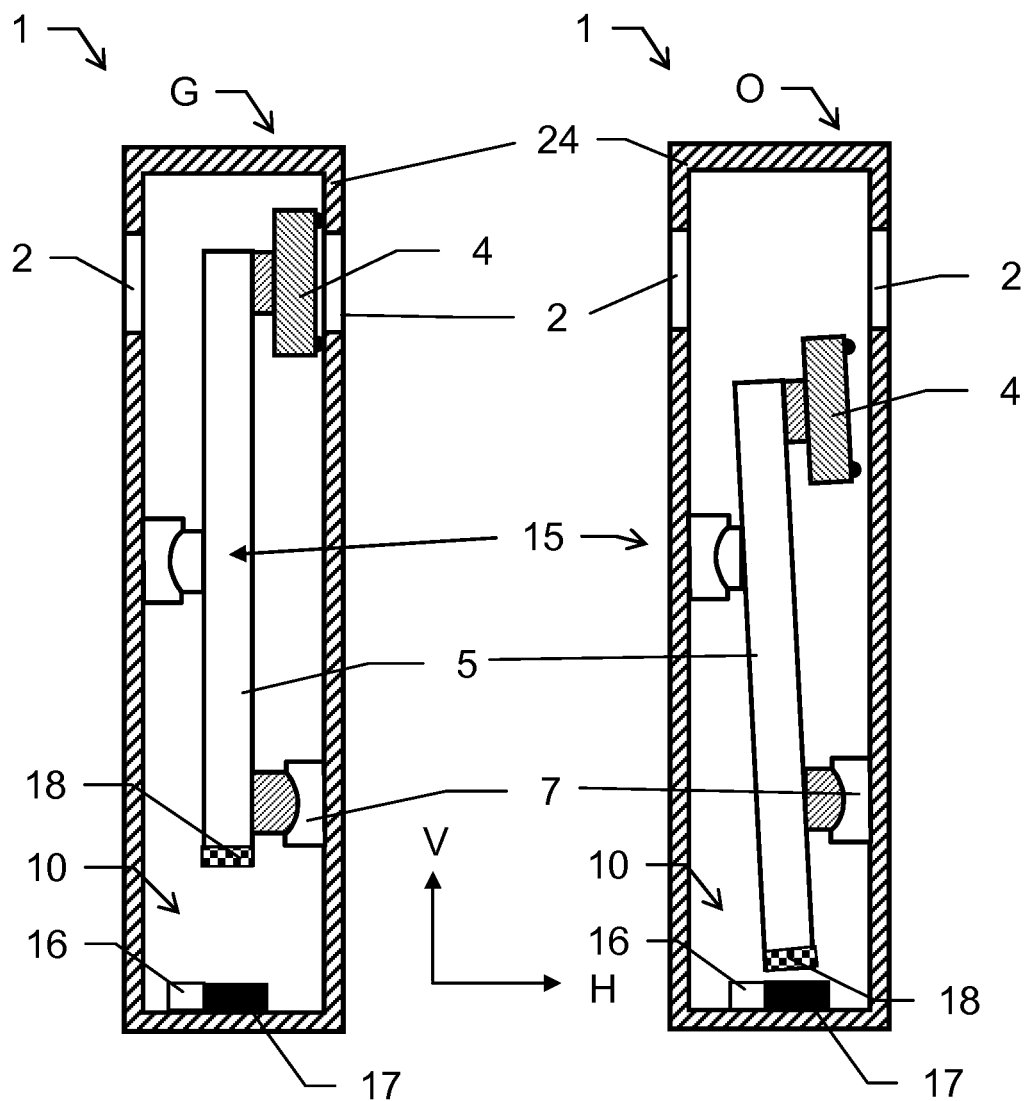

The figures show in detail:

FIG. 1a, b show a possible first embodiment of a vacuum valve according to the invention as a monovalve;

FIG. 2 shows a possible second embodiment of a vacuum valve according to the invention as a monovalve;

FIGS. 3a-c show a possible further embodiment of a vacuum valve according to the invention as a transfer valve;

FIG. 4a, b show a schematic illustration of a further embodiment according to the invention of a vacuum valve as a pendulum valve;

FIG. 5a, b show a schematic illustration of a further embodiment according to the invention of a vacuum valve as a transfer valve; and FIG. 6a, b show a schematic illustration of a further embodiment according to the invention of a vacuum valve as a transfer valve.

Figure 1B:
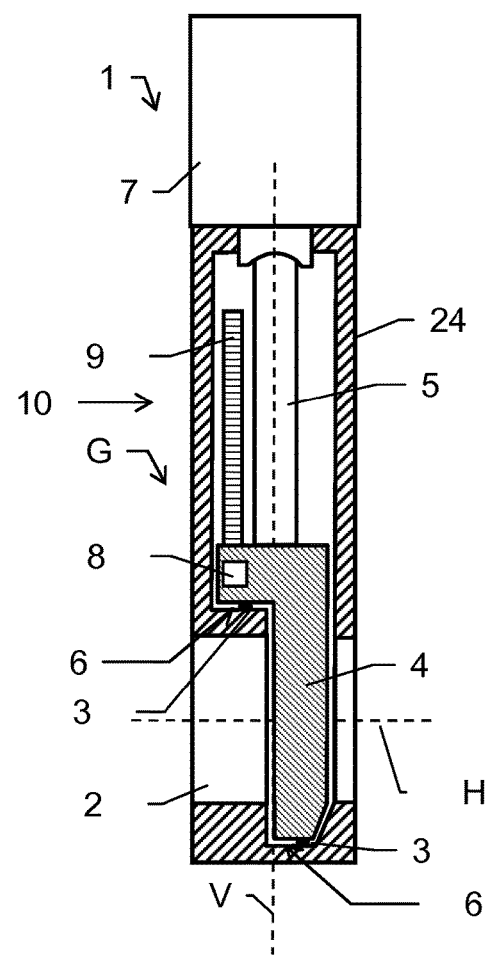

FIGS. 1a, 1b schematically show a first embodiment of a vacuum valve 1 according to the invention. In the example, the valve 1 is embodied as a so-called monovalve and is shown in cross-section in an open position O (FIG. 1a) and a closed position G (FIG. 1b).

The valve 1, for the gas-tight closing of a flow path by means of a linear movement, has a valve housing 24 comprising an opening 2 for the flow path, wherein the opening 2 has a geometrical opening axis H along the flow path. The opening 2 connects a first gas region L, which is located in the drawing on the left of the valve 1 and/or a partition wall (not shown), to a second gas region R on the right thereof. Such a partition wall is formed, for example, by a chamber wall of a vacuum chamber.

The closure element 4 is displaceable linearly along a geometric adjustment axis V, which extends transversely to the opening axis H, in a closure element plane 22 from an open position O, which releases the opening 2, into a closed position G, which is pushed linearly over the opening 2, in a closing direction and vice versa back in an opening direction by means of a drive unit 7 having a movable positioning element 5, in the example an adjustment arm.

For example, a curved first sealing surface 3 encloses the opening 2 of the valve housing 24 along a first section 21a in a first plane 20a and along a second section 21b in a second plane 20b. The first plane 20a and the second plane 20b are spaced apart from one another, extend parallel to one another, and extend parallel to the closure element plane 22. The first section 21a and the opposing second section 21b therefore have a geometric offset in relation to one another transversely to the adjustment axis V and in the direction of the opening axis H. The opening 2 is arranged between the two opposing sections 21a and 21b in the region extending along the adjustment axis V.

The closure element 4 has a second sealing surface 6, which extends along sections corresponding to the first and second sections 21a, 21b, corresponding to the first sealing surface 3.

Monovalves, i.e., vacuum valves closable by means of a single linear movement, have the advantage, for example, of a comparatively simple closing mechanism, for example, compared to the transfer valves closable by means of two movements, which require a comparatively complexly constructed drive. Since the closure element can moreover be formed in one piece, it can be subjected to high acceleration forces, and therefore this valve can also be used for rapid and emergency closures. The closing and sealing can take place by means of a single linear movement, and therefore very rapid closing and opening of the valve 1 is possible.

In particular, one advantage of monovalves is, for example, that the seal 3, 6, because of its profile during closing, is not subjected to a transverse load in the transverse direction in relation to the longitudinal extension of the seal 3, 6. On the other hand, the seal 3, 6 is hardly capable, because of its transverse extension in relation to the opening axis H, of absorbing forces occurring on the closure element 4 along the opening axis H, which can act on the closure element 4 in particular in the case of large differential pressure, which requires a robust construction of the closure element 4, its drive, and its mounting.

According to the invention, the vacuum valve 1 shown in FIGS. 1a and 1b comprises a displacement sensor 10, which in the example has a position-transducing element (target) 8 and a sensor surface 9 (ruler) for the detection thereof. The displacement sensor 10 is designed, for example, as a (contactless) inductive displacement sensor, for example, a differential transformer having displaceable core, a pulsed inductive linear position sensor, PLCD displacement sensor (permanent linear contactless displacement sensor), optoelectronic displacement sensor, potentiometric displacement sensor, magnetostrictive displacement sensor, capacitive displacement sensor, or magnetic displacement sensor. Depending on the sensor 10, the ruler 9 is active and the position-transducing element 8 is passive or vice versa, i.e., the (electrical or electronic) measurement signal and/or analysis signal is generated or tapped either by the ruler 9 or element 8, respectively.

In the example, the target 8 is fastened on or in the adjustment element 4, and therefore it moves with it along the adjustment axis V. The sensor surface 9 extends in the adjustment direction V at least over the entire adjustment distance, and therefore the position of the target 8 and thus the adjustment element 4 is measurable over the entire possible linear movement of the adjustment element 4. The position is ascertained in this case in relation to a starting or null position, which is preferably either the open position O or the closed position G. The displacement sensor 10 is preferably an absolute encoder in this case. Alternatively, an incremental displacement sensor is used.

The actual position of the adjustment element 4 can thus advantageously be determined by means of the position sensor 10. The position measurement can be restricted in this case to the determination of one or a few positions, preferably the end position (i.e., open position O and/or closed position G), for example, in the meaning of an end location detection. However, an ongoing or continuous position determination preferably takes place, and therefore the position of the adjustment element 4 is known progressively and in particular the time curve thereof is known.

By way of the sensor arrangement according to the invention, for example, the closing capability of the valve can therefore be checked during a process sequence, the contact pressure can be regulated accordingly, and a failure of the leak-tightness can possibly be predicted. In particular, for example, the compression can be set individually using an electric drive unit 7. Using a pneumatic drive 7, it can at least be checked using the sensor arrangement whether the valve is closed.

The knowledge of the chronological movement curve is optionally used to determine the velocity of the linear movement of the closure element 4 therefrom. This can advantageously be used for an improved end location determination, whereby tolerances in the vacuum valve become less critical. The exact duration for the closing or opening procedure may thus also be ascertained, whereby, for example, optimizations or fault recognition are enabled. In general, an analysis of the time-displacement curve, which is performed, for example, by an external data processing system, to which the position sensor 10 and/or the vacuum valve 1 is connected, enables inferences about the state of the valve 1. Irregularities or changes in the course of the operating cycles can thus be recognized, and the state of the moving components or the sealing surfaces 3, 6 can thus be concluded, for example. If the two sealing surfaces 3, 6 adhere to one another in the closed position G, for example, it is thus recognizable in the movement sequence, since the position of the adjustment element 4 remains constant for a certain length of time because of the adhesive force, although it is driven by the drive unit 7 via the adjustment element 5, followed by a rapid opening movement and a brief recoil.

FIG. 2 shows an alternative to the embodiment according to FIGS. 1a, 1b. In this example, the vacuum valve 1 has a position sensor 10 designed as a distance sensor. The distance sensor 10 is, for example, an optoelectronic distance sensor or an ultrasonic sensor and emits a corresponding measurement signal 13 by means of an emitter, for example, laser light, in the direction of the adjustment element 4 and/or the vertical axis V, and therefore the signal 13 is incident on the adjustment element 4 (in the example on its rear surface), is at least partially reflected therefrom, and is received again by a detector of the sensor 10. In this case, the distance between sensor 10 and adjustment element 4 and therefore the position of the adjustment element 4 is determined by means of determination of the signal runtime (pulse runtime method) and/or phase difference measurement, phase or frequency runtime methods, and/or according to the Fizeau principle. As a further option, a position determination takes place by means of triangulation.

To improve the distance and/or position measurement, in the example, the vacuum valve 1 has a reflector 14 arranged on the adjustment element, which is designed to reflect the measurement signal 13 toward the sensor 10 and thus improve the signal level of the received measurement signal 13.

Alternatively to the illustrated arrangement, the sensor 10 is arranged on the moving part, i.e., on the closure 4 here, and emits measurement radiation 13 toward a static point of the valve 1 (i.e., an inverted arrangement from the illustration).

FIGS. 3a-3c show a further embodiment of a vacuum valve 1 according to the invention, which is designed in the example as a transfer valve, illustrated in different closure positions.

The transfer valve shown is a special form of a slide valve. The vacuum valve has a rectangular, plate-shaped closure element 4 (for example, valve plate), which has a sealing surface 6 for the gas-tight closing of an opening 2. The opening 2 has a cross-section corresponding to the closure element 4 and is formed in a wall 12. The opening 2 is enclosed by a valve seat, which in turn also provides a sealing surface 3 corresponding to the sealing surface 6 of the closure element 4. The sealing surface 6 of the closure element 4 is circumferential around the closure element 4 and has a sealing material (seal). In a closed position, the sealing surfaces 6, 3 are pressed against one another and the sealing material is compressed at the same time.

The opening 2 connects a first gas region L, which is located on the left of the wall 12, to a second gas region R on the right of the wall 12. The wall 12 is formed, for example, by a chamber wall of a vacuum chamber. The vacuum valve 1 is then formed by an interaction of the chamber wall 12 with the closure element 4.

The closure element 4 is arranged on an adjustment arm 5, which is rod-shaped here, for example, and which extends along a geometric adjustment axis V. The adjustment arm 5 is mechanically coupled to a drive unit 7, by means of which the closure element 4 is adjustable in a first gas region L on the left of the wall 12 by adjustment of the adjustment arm 5 by means of the drive unit 7 between an open position O (FIG. 3a) via an intermediate position Z (FIG. 3b) into a closed position G (FIG. 3c).

In the open position O, the closure element 4 is located outside the projection region of the opening 2 and releases it completely, as shown in FIG. 3a.

By adjusting the adjustment arm 5 in the axial direction parallel to the first, "vertical" adjustment axis V and parallel to the wall 12, the closure element 4 can be adjusted by means of the drive unit 7 from the open position O into the intermediate position Z.

In this intermediate position Z (FIG. 3b), the sealing surface 6 of the closure element 4 overlaps the opening 2 and is located in a position spaced apart opposite to the sealing surface 3 of the valve seat enclosing the opening 2.

By adjusting the adjustment arm 5 in the direction of the second "horizontal" adjustment axis H (transversely to the first adjustment axis V), i.e., for example, perpendicularly to the wall 12 and to the valve seat, the closure element 4 can be adjusted from the intermediate position Z into the closed position G (FIG. 3c).

In the closed position G, the closure element 4 closes the opening 2 in a gas-tight manner and separates the first gas region L from the second gas region R in a gas-tight manner.

The opening and closing of the vacuum valve thus takes place by means of the drive unit 7 by way of an L-shaped movement in two directions H, V perpendicular to one another of the closure element 4 and the adjustment arm 5. The transfer valve shown is therefore also called an L-type valve.

A transfer valve 1 as shown is typically provided for sealing a process volume (vacuum chamber) and for loading and unloading the volume. Frequent changes between the open position O and the closed position G are the rule in the case of such a use. Increased appearances of wear of the sealing surfaces 6, 3 and the mechanically moved components, for example, the adjustment element 5 or other parts of the drive unit 7, can thus occur.

For early determination of such appearances of wear, among other things, the vacuum valve 1 according to the invention has a position sensor 10, which is designed in the example as a two-axis displacement sensor. In contrast to the embodiment according to the example of FIG. 1a, b, a position is determined in both adjustment directions V, H by means of a target 8 attached to the adjustment element 5. For this purpose, the vacuum valve 1 has a first "vertical" ruler 9v for the position determination of the "vertical" movement between the open position O to the intermediate position Z and a second, "horizontal" ruler 9h for the position determination of the "horizontal" movement between the intermediate position Z and the closed position G. By means of the target 8 arranged on the adjustment element 5 and the first ruler 9v, in sequential sequence according to the sequential movement sequence open position O—intermediate position Z—closed position G (or vice versa), the position of the adjustment element 5 is thus measured in the first, "vertical" adjustment direction V, and by means of the target 8 and the second ruler 9h, the position is measured in the second, "horizontal" adjustment direction H.

In the example, the valve 1 and/or the position sensor 10 furthermore has a control and/or analysis unit 11, using which the position measurement is controlled and/or position data are recorded or analyzed, and therefore, for example, an external computer can (substantially) be dispensed with and, for example, solely valve-internal monitoring or state monitoring of the valve 1 takes place.

Alternatively to the illustrated sequentially arranged two linear rulers 9v, 9h, a single 2D sensor surface is used (not shown), which is optically scanned, for example, and therefore a simultaneous determination of the position of the adjustment element 5 in both axes or directions V and H is enabled.

As a further alternative, the position determination with respect to the two adjustment directions V, H or the two adjustment movements does not take place by means of a single position sensor 10, but rather the valve 1 has one position sensor 10 for each adjustment direction V, H or adjustment movement, and thus comprises two position sensors 10.

Figure 4B:
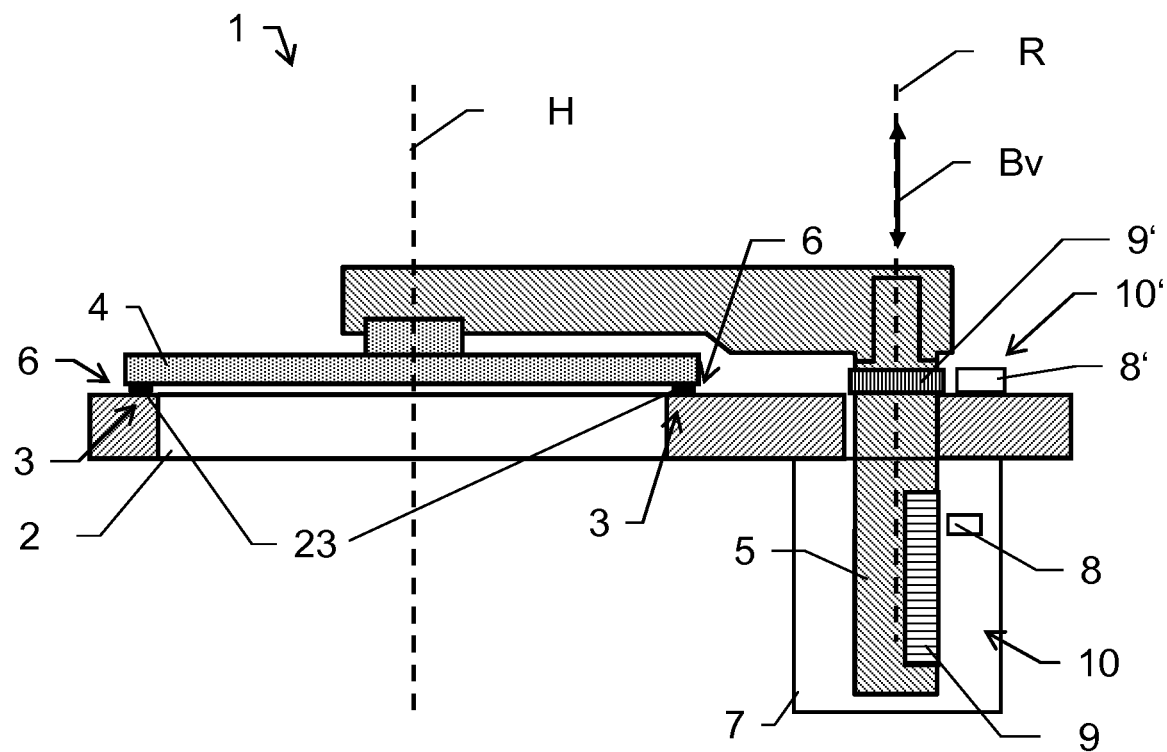

FIG. 4a and FIG. 4b schematically show a further possible embodiment of the valve according to the invention in the form of a pendulum valve 1. The valve 1 for the essentially gas-tight interruption of a flow path has a valve housing, which has an opening 2. The opening 2 has a circular cross-section here, for example. The opening 2 is enclosed by a valve seat. This valve seat is formed by a (first) sealing surface 3, which faces axially in the direction of a valve plate 4 and extends transversely to the opening axis H, has the shape of a circular ring, and is formed in the valve housing. The valve plate 4 is pivotable around an axis of rotation R and is adjustable essentially parallel to the opening axis H. In a closed position G (FIG. 4b) of the valve plate 4 (valve closure), the opening 2 is closed gas-tight by means of the valve plate 4, which has a second sealing surface 6. An open position O of the valve plate 4 is illustrated in FIG. 4a.

The valve plate 4 is connected via an arm 5, which is arranged laterally on the plate and extends perpendicularly to the opening axis H, to a drive unit 7. This arm 5 is located, in the closed position G of the valve plate 4, outside the opening cross-section of the opening 2 geometrically projected along the opening axis H.

The drive 7 is designed by use of a motor and a corresponding gearing such that the valve plate 4—as is typical in a pendulum valve—is pivotable by means of a transverse movement x of the drive 7 transversely to the opening axis H and essentially parallel over the cross-section of the opening 2 and perpendicularly to the opening axis H in the form of a pivot movement Br around the pivot axis R between an open position O and an intermediate position and is linearly displaceable by means of a longitudinal movement By of the drive 7 occurring parallel to the opening axis 5. In the open position O, the valve plate 4 is positioned in a dwell section arranged laterally adjacent to the opening 2, and therefore the opening 2 and the flow path are released. In the intermediate position, the valve plate 4 is positioned spaced apart above the opening 2 and covers the opening cross-section of the opening 2. In the closed position, the opening 2 is closed gas-tight and the flow path is interrupted, in that a gas-tight contact exists between the sealing surface 6 of the valve closure 4 (valve plate) and the sealing surface 3 of the valve seat.

To enable automated and regulated opening and closing of the valve 1, the valve 1 provides, for example, an electronic regulating and control unit (not shown), which is designed and is connected to the drive 7 such that the valve plate 4 is adjustable accordingly for the gas-tight termination of a process volume or for the regulation of an internal pressure of this volume.

In the present exemplary embodiment, the drive 7 is designed as an electric motor, wherein the gearing is switchable such that driving of the drive 78 causes either the transverse movement Br or the longitudinal movement By. The drive including gearing is electronically activated by the regulator. Such gearings, in particular having slotted link shift units, are known from the prior art. It is furthermore possible to use multiple drives to cause the rotational movement Br and the linear movement Bv, wherein the controller assumes the activation of the drives.

The precise regulation and/or setting of the flow rate using the described pendulum valve 1 is possible not only by way of the pivoting adjustment of the valve plate 4 between the open position O and the intermediate position by means of the transverse movement Br, but rather above all by linear adjustment of the valve plate 4 along the opening axis H and/or R between the intermediate position and the closed position by means of the longitudinal movement By. The described pendulum valve can be used for precise regulating tasks.

Both the valve plate 4 and also the valve seat each have a sealing surface—a first and a second sealing surface 3, 6. The first sealing surface 3 moreover has a seal 23. This seal 23 can be, for example, vulcanized as a polymer by means of vulcanization onto the valve seat. Alternatively, the seal 23 can be embodied, for example, as an O-ring in a groove of the valve seat. A sealing material can also be adhesively bonded onto the valve seat and thus embody the seal 23. In an alternative embodiment, the seal 23 can be arranged on the side of the valve plate 4, in particular on the second sealing surface 6. Combinations of these embodiments are also conceivable. Such seals 23 are of course, not restricted to the valve 1 described in the example, but rather are also applicable in the further described valve embodiments.

The valve plate 4 is variably set, for example, on the basis of regulating variables and an output control signal. An item of information about a present pressure state in a process volume connected to the valve 1, for example, is received as an input signal. Moreover, a further input variable, for example, a mass inflow into the volume, can be provided to the regulator. On the basis of these variables and on the basis of a predefined setpoint pressure, which is to be set or achieved for the volume, a regulated setting of the valve 1 then takes place over the time of a regulating cycle, and therefore a mass outflow out of the volume can be regulated over time by means of the valve 1. For this purpose, a vacuum pump is provided behind the valve 1, i.e., the valve 1 is arranged between the process chamber and the pump. A desired pressure curve can thus be modulated.

A respective opening cross-section for the valve opening 2 is set by the setting of the valve closure 4 and thus the possible gas quantity is set which can be evacuated per unit of time out of the process volume. The valve closure 4 can have a shape deviating from a circular shape for this purpose, in particular to achieve the most laminar possible media flow.

To set the opening cross-section, the valve plate 4 is adjustable by the regulating and control unit by means of the transverse movement Br of the drive 7 from the open position O into the intermediate position and by means of the longitudinal movement By of the drive 7 from the intermediate position into the closed position. To completely open the flow path, the valve plate 4 is adjustable by the controller by means of the longitudinal movement By of the drive 7 from the closed position G into the intermediate position and therefrom by means of the rotational movement Br of the drive 7 from the intermediate position into the open position O.

The pressing of the valve plate 4 onto the valve seat has to take place such that both the required gas-tightness is ensured within the entire pressure range, and also damage to the valve 1, or more precisely the sealing surfaces 3, 6 or the seal(s) 23 due to excessively large pressure strain is avoided. To ensure this, known valve plates provide a contact pressure regulation of the valve plate 4 regulated as a function of the pressure difference prevailing between the two valve plate sides.

According to the invention, the valve 1 has two position sensors 10 and 10', designed in the example as linear encoder 10 and angle encoder 10'.

The linear position sensor 10 has a scale 9, which extends on the arm 5 along the linear movement direction By on the arm 5 and is therefore movable in the feed direction By in relation to the stationary part of the valve 1, i.e., for example, in relation to the valve housing or the drive unit 7. The respective relative position is ascertained by the linear encoder by means of a read head 8, which scans the scale 9, which have a position code for this purpose. The scale 9 and/or the read head are formed at least partially "wide" in this case such that a linear position is also measurable in different rotational positions of the arm 5. The scale 9 thus extends, for example, far enough around the arm 5 that a part thereof is opposite to the detector 8 both in the open position O and also in the closed position G and the scale 9 cannot be pivoted out of the "field of vision" of the detector 8.

The position code is preferably an absolute position code. Alternatively, the position code is an incremental code. In absolute position sensors 10, 10', a position can be associated directly with every relative location of read head 8 to scale 9 (which is related to a previously defined null position), in that the scale 9 has an absolute position code made of unique code words over the entire measurement distance, which can be associated with precisely one position by a control and analysis unit. In position encoders 10, 10' having incremental determination of positions, in contrast, the scanning signals are not unique, but rather repeat multiple times over the entire measurement range. The distance to which an increment corresponds is stored in a control and analysis unit of the encoder. The distance which is covered during a relative movement of scale 9 and read head 8 can therefore be saved, and a relative position can thus be determined by counting the increments. To locate such a relative position in an absolute manner, in the case of a relative movement, one proceeds from a defined null position as an absolute reference point. Such a null position or null point is defined, for example, by a position reference marker, which is detected by the read head 8, on the scale 9 (or in the case of a stationary scale 9 on the read head 8). Sensors 10, 10' having incremental determination of translation locations or angles therefore have the disadvantage that in the event of a restart of the measurement system, one has to proceed each time from a null or reference position. In contrast, absolute linear or angle encoders generate unique differentiable scanning signals for each relative location of the parts which can be translated or rotated in relation to one another. A unique linear position and/or a unique angle can thus be associated directly with a respective relative location, i.e., without approaching a reference or starting position.

The second position sensor 10' designed as an angle encoder also has a scale 9', having an absolute or incremental angle coding, which is scanned by a read head 8', and therefore an item of information can be obtained about the angle position of the arm 5 and thus of the valve plate 4. In the example, the scale 9' extends at least partially around the arm 5 (at least enough that the circumference of the rotational movement Br is covered thereby), and therefore it is rotatable with the arm 5 in relation to the stationary detector 8' or the entire stationary part of the valve 1.

By means of the first and second position sensor 10, 10', the location of the movable parts of the valve 1, in particular the valve plate 4, and thus the state of the vacuum valve 1, in particular with respect to gas-tightness and/or required reliability of the gas-tight closing capability, can thus advantageously be monitored and evaluated in an ongoing manner.

Alternatively to a pendulum valve 1 as shown, the vacuum valve 1 according to the invention can be implemented using another vacuum valve type, for example, a flap valve, slide valve, or a so-called butterfly control valve. Furthermore, pendulum valves are also usable, the closure of which can only be adjusted in one direction.

FIGS. 5*a* and 5*b* schematically show a further possible position sensor arrangement in transfer valves according to the invention, illustrated in a closed position G (FIG. 5*a*) and an open position O (FIG. 5*b*). In the figures shown, the valve seat 3 is formed on a housing 24 of the vacuum valve 1. However, it is clear to a person skilled in the art that the following description is applicable essentially similarly to embodiments, wherein the valve seat is provided by a process chamber, i.e., a chamber housing.

Furthermore, it is apparent that the valve mechanism, which is illustrated here solely schematically as a tilt mechanism, is not to be understood as restrictive and a person skilled in the art can transfer the sensor arrangement according to the invention in a similar manner, for example, to an arbitrary L-motion drive, for example, an L-motion drive having two linear adjustment directions of the valve plate perpendicular to one another.

For the monitored guiding of the adjustment arm 5, the vacuum valve 1 has here, for example, a guide component 15, wherein the drive unit 7 and the guide component 15 are each in a fixed arrangement in relation to one another, here, for example, in that both the drive unit 7 and also the guide component 15 are each connected fixed in place to the valve housing 24. The adjustment arm 5 is furthermore mechanically coupled to the valve closure 4 and the drive unit 7, wherein by adjusting the valve arm 5 by means of the drive unit 7, the valve closure 4 is adjustable between the open position O and the closed position G essentially parallel to the valve seat, in particular in an L-motion movement as described in FIGS. 3*a* to 3*c*.

According to the invention, the guide component has a position sensor 10. The position sensor 10 is designed in this case such that both the "vertical" component V of the movement of the arm 5 and/or the valve plate 4 can be measured, and also the "horizontal" component H thereof. The position sensor 10 has a rotary encoder for this purpose, for example, which is used both for determining the tilt position of the arm 5 (i.e., the "horizontal" component) and also its linear translation, in that it is converted beforehand into a rotational movement. Alternatively to the illustration, two separate position sensors are used and/or the position sensor or sensors are arranged at another point in the valve, for example, on the drive 7.

FIGS. 6*a* and 6*b* show, similarly to FIGS. 5*a*, 5*b*, a further possible embodiment of a vacuum valve 1 according to the invention. In contrast to the embodiment according to FIGS. 5*a*, 5*b*, the position sensor 10 for measuring the position of the valve closure 4 and/or the adjustment element 5 is designed here as a system having an illumination means 16, for example, an LED, for illuminating the rear end of the adjustment arm 5 and a camera system 17 for acquiring illumination radiation reflected from the adjustment arm 5. The camera system 17 has, for example, a position-sensitive detector, and therefore a position of the adjustment arm 5 can be concluded from radiation reflected from the incidence position onto the detector. Alternatively, for example, a generation of an image by means of the acquired radiation and an image analysis are performed, such that a position is determinable therefrom. Camera-based position determinations are known in principle from the prior art. The use of a pattern which can be optically acquired to improve imaging position determination is also known. Accordingly—as shown—the rear end of the adjustment element 5 has such an optical pattern 18. The "horizontal" position of the adjustment element 5 can be concluded from the position of the pattern 18 in the camera image, and its "vertical" position (distance to the camera) can be concluded from the imaged size of the image pattern, or from parts thereof (in comparison to a stored reference variable).

It is obvious that these illustrated figures only schematically illustrate possible exemplary embodiments. The various approaches can also be combined with one another and with methods and devices of the prior art.

The invention claimed is:

1. A vacuum valve, including a vacuum slide valve, pendulum valve, or monovalve, for a regulation of a volume or mass flow and/or for a gas-tight interruption of a flow path, comprising:
   a valve seat, which has a valve opening defining an opening axis (H) and a first sealing surface circumferential around the valve opening,
   a valve closure for the regulation of the volume or mass flow and/or for the gas-tight interruption of the flow path, comprising a second sealing surface corresponding to the first sealing surface, a variable location of which is determined by a respective position and alignment of the valve closure,
   a drive unit coupled to the valve closure, comprising at least one movable adjustment element, wherein the drive unit is designed to execute an adjustment movement (Bv, Bh, Br), such that the valve closure is adjustable from
      an open position (O), in which the valve closure and the valve seat are provided without contact in relation to one another, into
      a closed position (G), in which an axially sealing contact with respect to the opening axis (H) exists between the first sealing surface and the second sealing surface, via a seal, and the valve opening is thus closed gas-tight,
      and back again,
   wherein the vacuum valve further comprises at least one position sensor, wherein the position sensor is designed and arranged in the vacuum valve such that, in an ongoing manner, a position of the valve closure and/or the at least one adjustment element is measurable with respect to a null position, the open position, or closed position,
   wherein the vacuum valve has a processing unit that processes an acquired position sensor measurement signal, wherein an item of state information of the vacuum valve is ascertained on the basis of the acquired measurement signal, and
   wherein based on a comparison of the item of state information to predefined tolerance values, an output signal is provided with respect to an evaluation of a process controlled by the vacuum valve.

2. The vacuum valve according to claim 1, wherein the position sensor is designed and arranged in the vacuum valve such that a time curve of at least a part of the adjustment movement (Bv, Bh, Br) is determinable, such that at least one velocity of the adjustment movement (Bv, Bh, Br) is determinable for at least one time span of the adjustment movement (Bv, Bh, Br).

3. The vacuum valve according to claim 1, wherein the position sensor is designed as a displacement sensor or distance sensor and/or absolute position sensor.

4. The vacuum valve according to claim 1, wherein the adjustment movement (Bv, Bh, Br) comprises an at least essentially linear adjustment movement (Bv, Bh) and the position sensor is designed and arranged to acquire at least a part of the linear adjustment movement (Bv, Bh), wherein the position sensor is a linear encoder.

5. The vacuum valve according to claim 1, wherein the adjustment movement (Bv, Bh, Br) comprises an at least essentially rotational adjustment movement (Br) and the position sensor is designed and arranged to acquire at least a part of the rotational adjustment movement (Br), wherein the position sensor is an angle encoder.

6. The vacuum valve according to claim 1, wherein the position sensor is an inductive, optical, magnetic, magnetostrictive, potentiometric, and/or capacitive position sensor, and/or is arranged outside a vacuum range separated from an external environment by the vacuum valve in a defined manner.

7. The vacuum valve according to claim 1, wherein the valve seat is formed by a part of the vacuum valve connected structurally to the vacuum valve, wherein the valve seat is formed on a housing of the vacuum valve, or is provided by a process chamber or a chamber housing.

8. The vacuum valve according to claim 1, wherein the item of state information is provided with respect to a mechanical and/or structural integrity of the valve closure and/or the adjustment element, wherein the item of state information is ascertained by means of an actual-setpoint comparison for the acquired measurement signal.

9. The vacuum valve according to claim 1, wherein the position sensor is designed and arranged in the vacuum valve such that a position measurement is performed via the at least one position sensor with respect to at least two adjustment directions, which are essentially orthogonal to one another.

10. The vacuum valve according to claim 1, wherein the at least one position sensor comprises at least two position sensors, which are designed and arranged in the vacuum valve such that a position with respect to a first adjustment direction is measurable with a first position sensor and a position with respect to a second adjustment direction is measurable with a second position sensor, both the first and second adjustment directions being essentially orthogonal to one another.

* * * * *